United States Patent
Elisseeff et al.

(10) Patent No.: US 9,909,447 B2
(45) Date of Patent: Mar. 6, 2018

(54) METHOD FOR MANUFACTURING A TURBOMACHINE CASING FROM A COMPOSITE MATERIAL AND ASSOCIATED CASING

(71) Applicant: SNECMA, Paris (FR)

(72) Inventors: Timothee Elisseeff, Moissy-Cramayel (FR); Sylvain Corradini, Moissy-Cramayel (FR)

(73) Assignee: SNECMA, Paris (FR)

( * ) Notice: Subject to any disclaimer, the term of this patent is extended or adjusted under 35 U.S.C. 154(b) by 401 days.

(21) Appl. No.: 14/415,183

(22) PCT Filed: Jul. 8, 2013

(86) PCT No.: PCT/FR2013/051626
§ 371 (c)(1),
(2) Date: Jan. 16, 2015

(87) PCT Pub. No.: WO2014/013161
PCT Pub. Date: Jan. 23, 2014

(65) Prior Publication Data
US 2015/0192032 A1    Jul. 9, 2015

(30) Foreign Application Priority Data
Jul. 16, 2012    (FR) ...................... 12 56850

(51) Int. Cl.
*F01D 25/00* (2006.01)
*F01D 25/24* (2006.01)
(Continued)

(52) U.S. Cl.
CPC ............ *F01D 25/005* (2013.01); *B29C 70/30* (2013.01); *F01D 25/24* (2013.01);
(Continued)

(58) Field of Classification Search
CPC ...... F01D 25/005; F01D 25/24; F01D 21/045; B29C 70/30; F05D 2260/95; F05D 2230/90
See application file for complete search history.

(56) References Cited

U.S. PATENT DOCUMENTS

| | | | |
|---|---|---|---|
| 2008/0145215 A1 | 6/2008 | Finn et al. | |
| 2010/0077721 A1 | 4/2010 | Marshall | |

(Continued)

FOREIGN PATENT DOCUMENTS

| | | |
|---|---|---|
| DE | 10 2006 041 321 A | 3/2008 |
| EP | 2 434 105 A2 | 3/2012 |

OTHER PUBLICATIONS

International Search Report dated Sep. 24, 2013, in PCT/FR2013/051626, filed Jul. 8, 2013.

*Primary Examiner* — Igor Kershteyn
*Assistant Examiner* — Brian P Wolcott
(74) *Attorney, Agent, or Firm* — Oblon, McClelland, Maier & Neustadt, L.L.P.

(57) ABSTRACT

A method for manufacturing a turbomachine casing from composite material including: creating a semi-rigid protective layer from dry glass fibers that protects against galvanic corrosion, arranging the protective layer on a profiled mandrel by applying the protective layer against the annular radial flange thereof, forming and densifying the fibrous reinforcement on the mandrel while covering the protective layer.

9 Claims, 2 Drawing Sheets

Figure 1:
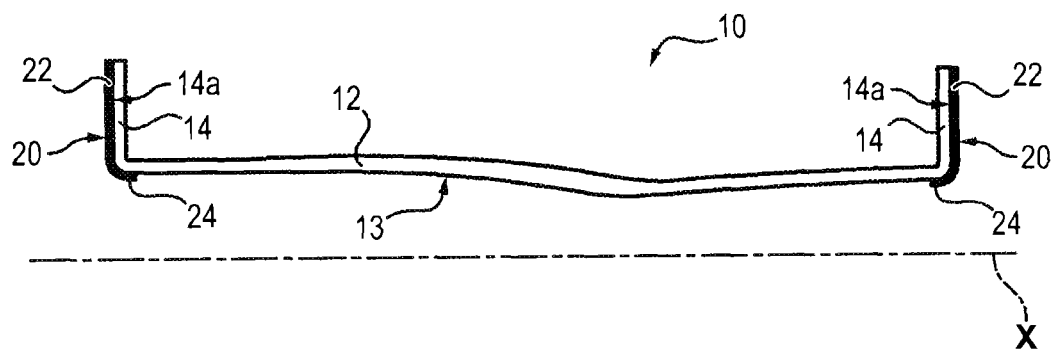

(51) Int. Cl.
*B29C 70/30* (2006.01)
*F01D 21/04* (2006.01)
*B29K 105/08* (2006.01)
*B29K 309/08* (2006.01)

(52) U.S. Cl.
CPC ...... *B29K 2105/08* (2013.01); *B29K 2309/08* (2013.01); *F01D 21/045* (2013.01); *F05D 2230/31* (2013.01); *F05D 2240/11* (2013.01); *F05D 2260/95* (2013.01); *F05D 2300/601* (2013.01); *F05D 2300/6032* (2013.01)

(56) References Cited

U.S. PATENT DOCUMENTS

| | | | |
|---|---|---|---|
| 2012/0076647 A1* | 3/2012 | Robertson, Jr. | F01D 21/045 415/182.1 |
| 2012/0099981 A1* | 4/2012 | Verseux | F01D 21/045 415/200 |
| 2012/0148392 A1 | 6/2012 | Lussier et al. | |

* cited by examiner

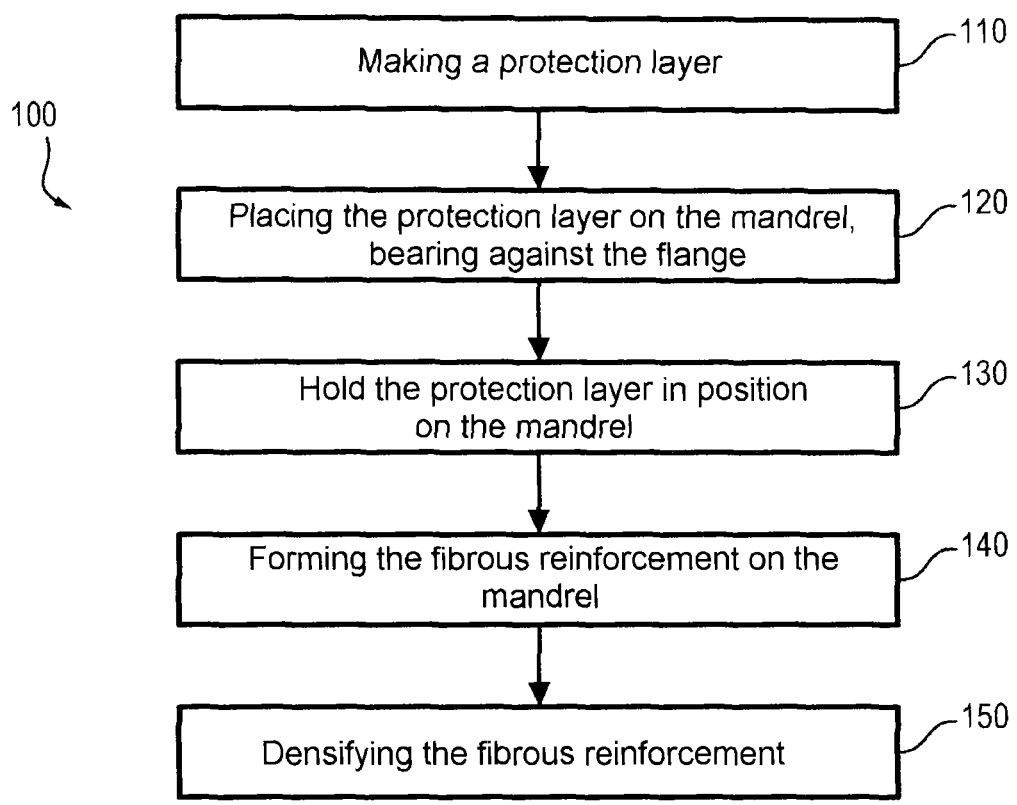

METHOD FOR MANUFACTURING A TURBOMACHINE CASING FROM A COMPOSITE MATERIAL AND ASSOCIATED CASING

The invention relates generally to a gas turbine casing, and more particularly to a retention casing for the fan of a gas turbine for an aviation engine, made of composite material including a fibrous reinforcement, consolidated by a matrix, and its associated manufacturing method.

The fan casing of a gas turbine aviation engine can perform several functions. It defines the air intake stream into the engine, supports an abradable material opposite the tips of the fan blades, supports a structure, generally in the form of acoustic panels, for attenuating sound waves at the engine intake and incorporates or supports a shield for retaining debris projected against the inner face of the casing such as ingested objects or debris from damaged blades.

Customarily, a fan casing includes a relatively thin wall defining the air intake stream. The casing can in particular be made of metal or of a composite material. For example, it was proposed in document FR 2 913 053 to make the fan casing of a composite material with variable thickness, by forming a fibrous reinforcement and densifying the reinforcement with a matrix. The fibrous reinforcement is formed by winding on a mandrel superposed layers of a fibrous textile obtained by three-dimensional weaving with changing thickness, so as to integrate the retaining shield by a simple increase in thickness.

The fibrous reinforcement includes fibers, particularly of carbon, glass, aramid or ceramic. As for the matrix, it is typically a polymer matrix, for example epoxy, bismaleimide or polyimide.

The casing can be made in a single piece and includes flanges at its axial ends. A first, or upstream, flange, allows attachment of an air intake sleeve to the casing, while the second, or downstream flange allows connection of the fan casing with an intermediate casing by means of connection members of the nut-and-bolt type, with interposition of an annular collar applied to the downstream face of the downstream flange. Here, upstream and downstream are defined by the direction of flow of the gases in the turbomachine. The intermediate casing is made of metal, of titanium, of a titanium-based metal alloy or of aluminum, the same as the annular collar and the air intake sleeve.

Nevertheless, when in particular the parts in contact with the fan casing are made of aluminum, so as to reduce the total mass of the turbine, and the fan casing is made of carbon fibers, a galvanic corrosion type chemical reaction between the fibers of the fan casing and the aluminum of the parts causes their rapid and premature deterioration.

Thus, document EP 2 434 105 describes a retaining casing of a fan of a turbomachine made of composite material, including generally cylindrical main body and an upstream flange. A metal plate is attached to the downstream face of the upstream flange, by means of a layer for protection against galvanic corrosion and an adhesive. The galvanic protection layer is assembled on the casing made of composite material after its manufacture.

As for document US 2012/099981, it describes a retaining casing of a turbomachine fan made of composite material, including a generally cylindrical main body, an upstream flange and a downstream flange. The casing includes an annular counter-plate applied to the upstream face of the downstream flange, and at least one annular collar fixed to the inner face of the casing. The collar can be made of a metallic material. In that case, a galvanic insulation layer, made of glass fibers for example, is interposed between the collar and the composite material of the casing prior to forming the fibrous preform. It may, however, prove difficult to fasten the galvanic protection layer to the fibrous textile of the casing and to control its dimensions.

Finally, document US 2012/148392 describes a fan retaining casing of a turbomachine made of composite material, including a generally cylindrical main body and an upstream flange.

None of these documents describes a casing made of composite material that is capable of resisting galvanic corrosion phenomena due to fastening of the casing to the upstream and downstream metal parts, to with the air intake sleeve and the intermediate casing. Moreover, known methods for applying the protective coating are difficult to implement and require dimensional adjustments.

One objective of the invention is therefore to propose a method for manufacturing a fan casing of a turbomachine of a composite material including a carbon-based fibrous reinforcement which is capable of resisting galvanic corrosion phenomena due to fastening the casing to the upstream and downstream metal parts of the turbomachine, which is simple to implement and the final dimensions whereof can be controlled.

To this end, the invention proposes a manufacturing method for a turbomachine casing made of composite material including fibrous reinforcement consolidated by a matrix, including the following consecutive steps:

- making a protective coating against galvanic corrosion from a braid of dried glass fibers, a strip of dried glass fibers or a twist of dried glass fibers, so as to obtain a semi-rigid layer for protection against galvanic corrosion,
- positioning the protection layer against galvanic corrosion on a mandrel with a profile corresponding to that of the casing to be fabricated including a radial annular flange, by applying the protection layer against the annular radial flange of the mandrel,
- forming the fibrous reinforcement on the mandrel by covering the protection layer, and
- densifying the fibrous reinforcement using a matrix.

Certain preferred but not limiting features of the method described above are the following:

- the layer for protection against galvanic corrosion is pre-formed to the dimensions of the mandrel and of the annular radial flange,
- the layer for protection against galvanic corrosion is reinforced with a binder,
- the layer for protection against galvanic corrosion is held in position on the mandrel by fastening members attached to the circumference of the annular radial flange of the mandrel during formation of the fibrous reinforcement, and
- the holding members are adjustable to the thickness of the protection layer.

The invention also proposes a turbomachine casing made of composite material obtained according to the above method, including a fibrous reinforcement consolidated by a matrix, including a generally cylindrical main body having a principal direction extending along a longitudinal axis, and at least one flange extending radially with respect to the longitudinal axis from a free end of the main body. The casing also includes a layer for protection against galvanic corrosion including glass fibers positioned against a radial surface of the annular flange and extending in alignment with an inner wall of the main body.

Certain preferred but not limiting features of the casing are the following:
- it includes an upstream flange and a downstream flange extending radially with respect to the longitudinal axis from an upstream and downstream free end, respectively, of the main body, and wherein the upstream flange and the downstream flange each include a layer for protection against galvanic corrosion positioned against the radial surface of said upstream and downstream flanges extending in alignment with the inner wall of the main body,
- the layer for protection against galvanic corrosion also includes a binder, and
- the layer for protection against galvanic corrosion has an L shaped longitudinal section, and includes a radial annular portion positioned against the radial surface of the flange, and an axial annular portion positioned against the inner wall of the main body.

Figure 2A:
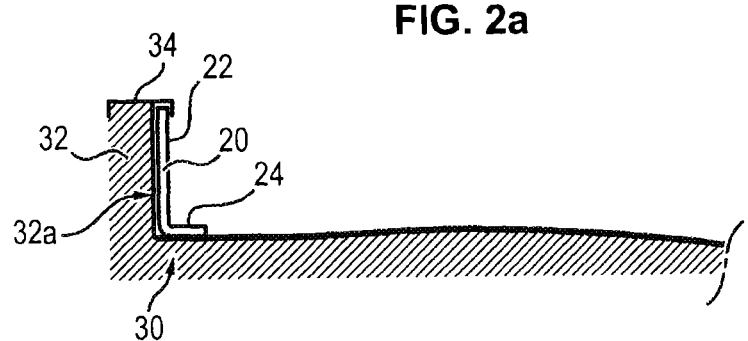
Figure 2B:
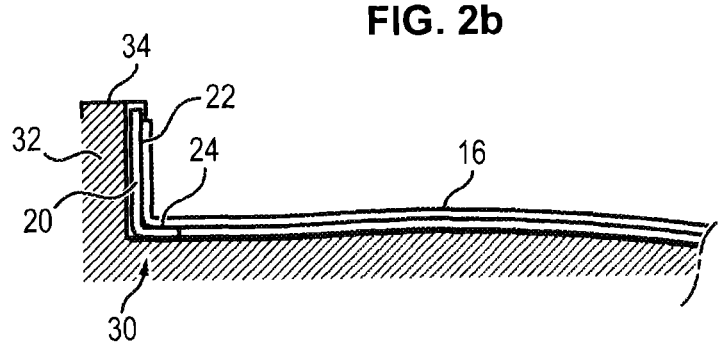

Other features, aims and advantages will be more apparent upon reading the detailed description that follows, made with reference to the appended figures given by way of non-limiting examples wherein:

FIG. 1 is a partial cross-section view of an example of a fan casing conforming to the invention, FIGS. 2a and 2b illustrate steps in manufacturing the fan casing of FIG. 1, and FIG. 3 is an organization chart showing the different steps of an embodiment of the manufacturing method of a casing conforming to the invention.

A gas turbine engine generally includes, from upstream to downstream in the gas flow direction, a fan, one or more compressor stages, for example a low-pressure compressor and a high-pressure compressor, a combustion chamber, one or more turbine stages, for example a high-pressure turbine and a low-pressure turbine, and a gas exhaust nozzle.

The turbines are coupled to the compressor and to the fan by respective coaxial shafts.

The engine is housed inside a casing including several portions corresponding to different elements of the engine. Thus, the fan is surrounded for example by a fan casing 10, which is connected upstream to an air intake sleeve and downstream to an annular collar of an intermediate casing.

The fan casing 10 includes a generally cylindrical main body 12, having a principal direction along a longitudinal axis X substantially parallel to the gas flow. The main body 12 of the casing can have a variable thickness, as shown in application FR 2 913 053, and can be equipped with external flanges 14 at its upstream and downstream ends so as to allow its assembly and its connection to other metal parts, including the air intake sleeve, the intermediate casing and the annular collar.

Here, the fan casing 10 is made of a composite material with a fibrous reinforcement consolidated with a matrix. The reinforcement is made of fibers, and includes in particular carbon fibers, and the matrix is made of a polymer, for example epoxy, bismaleic or polyimide.

The reinforcement can be formed by winding onto a mandrel 30 a fibrous textile 16 made by three-dimensional weaving with a varying thickness in conformity with the description of application FR 2 913 053, the fibrous reinforcement then constituting a complete fibrous preform of the fan casing 10 formed in a single piece with reinforcement portions corresponding to the flanges 14.

The mandrel 30 includes an outer surface the profile whereof corresponds to that of the inner surface of the casing 10 to be manufactured, as well as two flanges 32 extending radially from its free ends designed to form the upstream and downstream flanges 14 of the fan casing 10. By winding it onto the mandrel 30, the fibrous textile 16 then assumes the profile of the mandrel 30, so that its end portions form the portions of the preform corresponding to the flanges 14 of the casing 10 by resting on the flanges 32.

In order to protect from galvanic corrosion phenomena the metal parts in contact with the fan casing 10 (air intake sleeve, intermediate casing, annular collar), which are generally made of aluminum, a protection layer 20 is also positioned against the portion of the casing 10 designed to come into contact with the aluminum casing, to with the upstream and downstream flanges 14 of the casing 10.

For example the protection layer 20 can be positioned between the surface of the flanges 14 designed to come into contact with the metal parts, that is to say against the radial surface 14a of the flanges 14 which extends in alignment with the inner wall 13 of the fan casing 10. For the upstream flange 14, this is consequently its upstream surface, while for the downstream flange 14 it is its downstream surface.

In this manner, the protection layer 20 makes it possible to avoid contact between the aluminum and the fibrous reinforcement of the fan casing 10, and hence galvanic corrosion phenomena, without requiring any additional modification of the fan casing 10 or of the metal parts. Moreover, it simplifies control of the final dimensions of the fan casing 10, as well as finishing operations, the protection layer 20 forming an additional thickness that can be easily machined without thereby affecting the upstream or downstream flanges 14.

For example, the protection layer 20 can include glass fibers, possibly reinforced with a binder. The binder is then selected so as to be compatible with the matrix and to dissolve therein during densification of the fibrous reinforcement. It can for example be a polymer matrix compatible with polyepoxides. The weight of the protection layer 20 thus obtained is therefore moderate.

The protection layer 20 can have a straight cross-section and form a flat annular portion 22, so that it covers only (but completely) the radial surface 14a of the corresponding flange 14. It thus makes it possible to avoid any direct contact with metal parts.

As a variant, as illustrated in FIG. 1, the protection layer can have an L-shaped cross-section and form a bent ring including, besides a radial annular portion 22 designed to cover the radial surface 14a of the annular flange 14, a radial annular portion 24, positioned against the inner wall 13 of the fan casing 10.

One embodiment 100 of a fan casing 10 including a protection layer 20 against galvanic corrosion will now be described, wherein the protection layer 20 against galvanic corrosion is incorporated into the fibrous textile 16 of the fan casing 10 prior to its densification.

To that end, the protection layer 20 is applied 120 to the mandrel 30, while covering the flanges 32 designed to form the flanges 14 of the fan casing 10 and the entire body of the mandrel 30.

According to one embodiment, the protection layer 20 is preformed to the dimensions of the mandrel 30 and of the flanges 32. It therefore forms a ring having an inner diameter substantially equal to the outer diameter of the mandrel, and the radial dimension whereof is at most equal to that of the flanges 32. The protection layer 20 can for example be made (step 110) from a braid, from a strip or from a twist of dry glass fibers, possibly reinforced with a binder, and is then semi-rigid, which facilitates its placement on the mandrel 30 and allows simple and rapid control of its dimensions (thickness, diameter, etc.) and its quality. Moreover, implementation of a semi-rigid protection layer 20 makes it possible to hold the fibrous textile 16 in place during its subsequent winding on the mandrel 30, particularly in the first turn. This semi-rigid protection layer 20 is then rigidized when the fibrous textile 16 of the fan casing 10 is consolidated by a matrix.

As a variant, the protection layer 20 can be made of glass fibers reinforced with a polymerized resin. The protection layer 20 is then more rigid than in the first variant embodiment when it is placed on the mandrel 30.

The protection layer 20 then has an annular shape, corresponding to the annular shape of the flanges 32 of the mandrel 30, having a flat or L-shaped cross-section.

In the case of a protection layer 20 having a straight cross-section, a flat ring is applied to the radial surface 32a of each of the flanges 32 of the mandrel 30, so that once the fan casing 10 is made, only the surface of the flange 14 extending in alignment with the inner wall 13 of the fan casing 10 is covered by a protection layer 20.

In the case of a protection layer 20 having an L-shaped cross-section, a bent ring is applied to the radial surface 32a of each of the flanges 32, resting against the body of the mandrel 30. Thus, once the fan casing 10 is made, the axial end of the inner wall 13 of the fan casing 10 is also covered by the protection layer 20. This embodiment makes it possible to better hold in position of the fibrous textile 16, to avoid all direct contact with the adjoining metal parts, and to avoid galvanic corrosion phenomena caused by contact of the carbon fibers with water retained on the flanges 14 thanks to its axial annular portion 24.

The main body 12 of the casing is then made from composite material (step 140) by winding the fibrous textile 16 on the mandrel 30 in conformity with what is described for example in document FR 2 913 053.

To hold the protection layer 20 in position and to avoid having it slip during the winding step, it is possible in particular to attach it to the body of the mandrel 30 and/or to the flanges 32 using holding members 34 (step 130). These can in particular be clamps or clips distributed over the circumference of the corresponding flange 32. The number of holding members 34 depends on the diameter of the fan casing 10 and on the forces applied by the preform, and can be on the order of 2 to 10.

These holding members 34 can moreover be adjustable to the thickness of the protection layer 20.

The fibrous textile 16 is then wound on the mandrel 30 and the flanges 32, above the protection layer 20, while avoiding covering the fastening members 34 so as not to create a space between the protection layer 20 and the texture 16. The fibrous preform then covers the protection layer 20, with the exception of a narrow curb at the periphery of the protection layer 20, corresponding to zones of contact with the holding members 34.

During a final step (step 150), the fibrous preform 16 is then consolidated, as well as the protection layer 20, by injection of the matrix, in conformity with the description of document FR 2 913 053. The fan casing 10 thus obtained can then undergo finishing steps, particularly at the flanges 14 with incorporate the protection layer 20 against galvanic corrosion. In particular, machining of the flanges 14 of the fan casing is simplified, in that the protection layer 20 constitutes a sacrificial additional thickness which it is possible to machine without structurally damaging the fibrous reinforcement of the fan casing 10. The structure of the fan casing 10 therefore remains intact.

The final dimensions of the fan casing 10 are moreover better controlled.

The invention claimed is:

1. A method for manufacturing a turbomachine casing made of composite material including a fibrous reinforcement consolidated using a matrix, comprising:
    making a protection layer against galvanic corrosion from a braid of dried glass fibers, a strip of dried glass fibers or a twist of dried glass fibers to obtain a semi-rigid layer for protection against galvanic corrosion;
    placing the protection layer against galvanic corrosion on a mandrel, the mandrel having a profile corresponding to that of the casing to be manufactured and including a radial annular flange, and applying the protection layer against galvanic corrosion against the radial annular flange of the mandrel;
    forming the fibrous reinforcement on the mandrel while covering the protection layer against galvanic corrosion; and
    densifying the fibrous reinforcement using a matrix.

2. The manufacturing method according to claim 1, wherein the protection layer against galvanic corrosion is preformed to dimensions of the mandrel and of the radial annular flange.

3. The manufacturing method according to claim 2, wherein the protection layer against galvanic corrosion is reinforced with a binder.

4. The manufacturing method according to claim 1, wherein the protection layer against galvanic corrosion is held in place on the mandrel by holding members fastened to a circumference of the radial annular flange of the mandrel during formation of the fibrous reinforcement.

5. The manufacturing method according to claim 4, wherein the holding members are adjustable to a thickness of the protection layer.

6. A turbomachine casing made of composite material comprising:
    a fibrous reinforcement consolidated by a matrix, including a generally cylindrical main body having a principal direction extending along a longitudinal axis, and at least one annular flange extending radially with respect to a longitudinal axis from a free end of the generally cylindrical main body;
    a protection layer against galvanic corrosion including glass fibers positioned against a radial surface of the at least one annular flange and an inner wall of the generally cylindrical main body and obtained by a method according to claim 1.

7. The turbomachine casing according to claim 6, wherein the at least one annular flange further comprises an upstream flange and a downstream flange extending radially with respect to the longitudinal axis from an upstream free end and a downstream free end respectively of the generally cylindrical main body, and wherein the upstream flange and the downstream flange each include a protection layer against galvanic corrosion positioned against a radial surface of the upstream flange and the downstream flange and the inner wall of the main body.

8. The turbomachine casing according to claim 6, wherein the protection layer against galvanic corrosion further includes a binder.

9. The turbomachine casing according to claim 6, wherein the protection layer against galvanic corrosion has an L-shaped cross-section and includes a radial annular portion positioned against the radial surface of the at least one annular flange and an axial annular portion positioned against the inner wall of the generally cylindrical main body.

* * * * *